3,198,930
CHAIN WELDING
Don M. Glendenning and Eugene W. Onulak, Huntington, Ind., assignors to The Locke Steel Chain Company, Huntington, Ind., a corporation of Connecticut
Filed Feb. 4, 1963, Ser. No. 255,977
5 Claims. (Cl. 219—93)

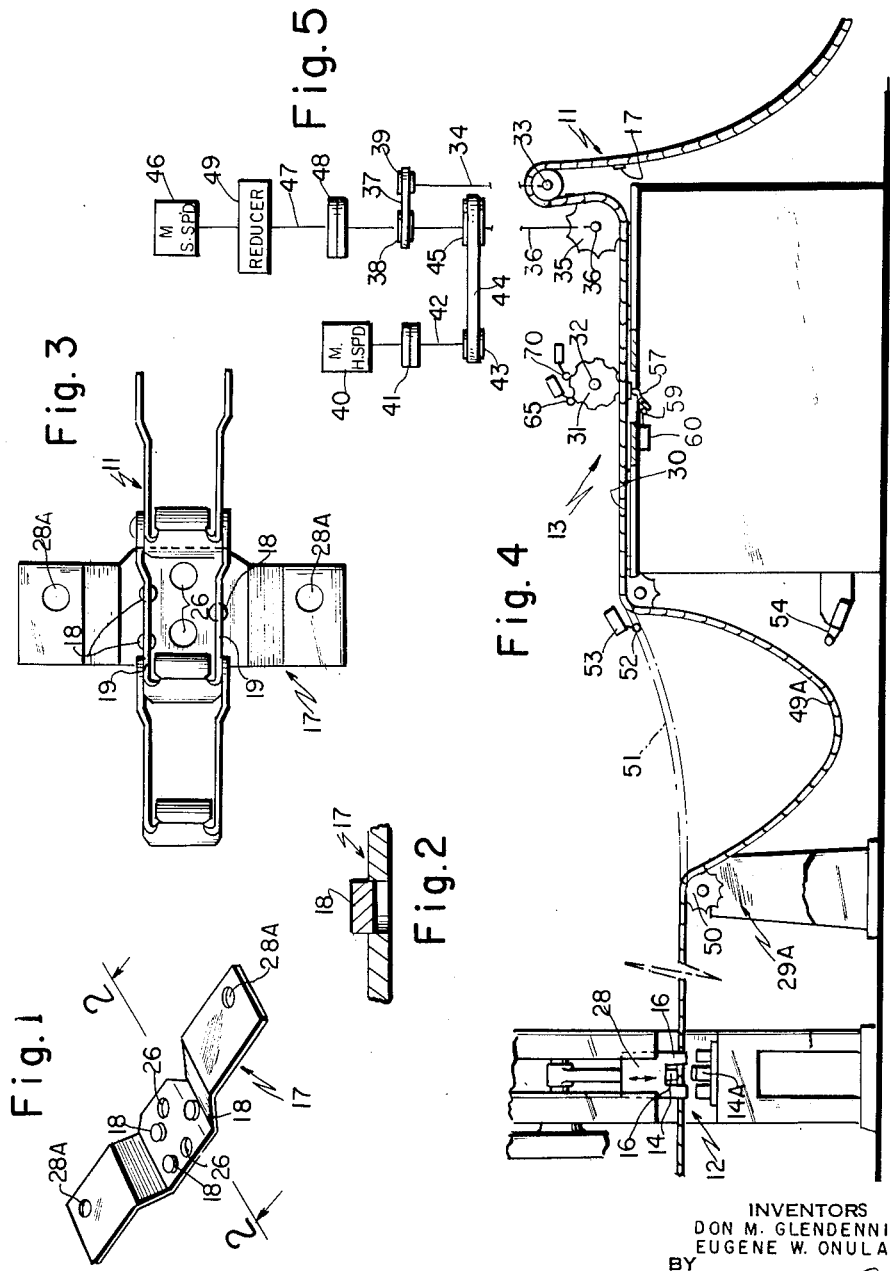

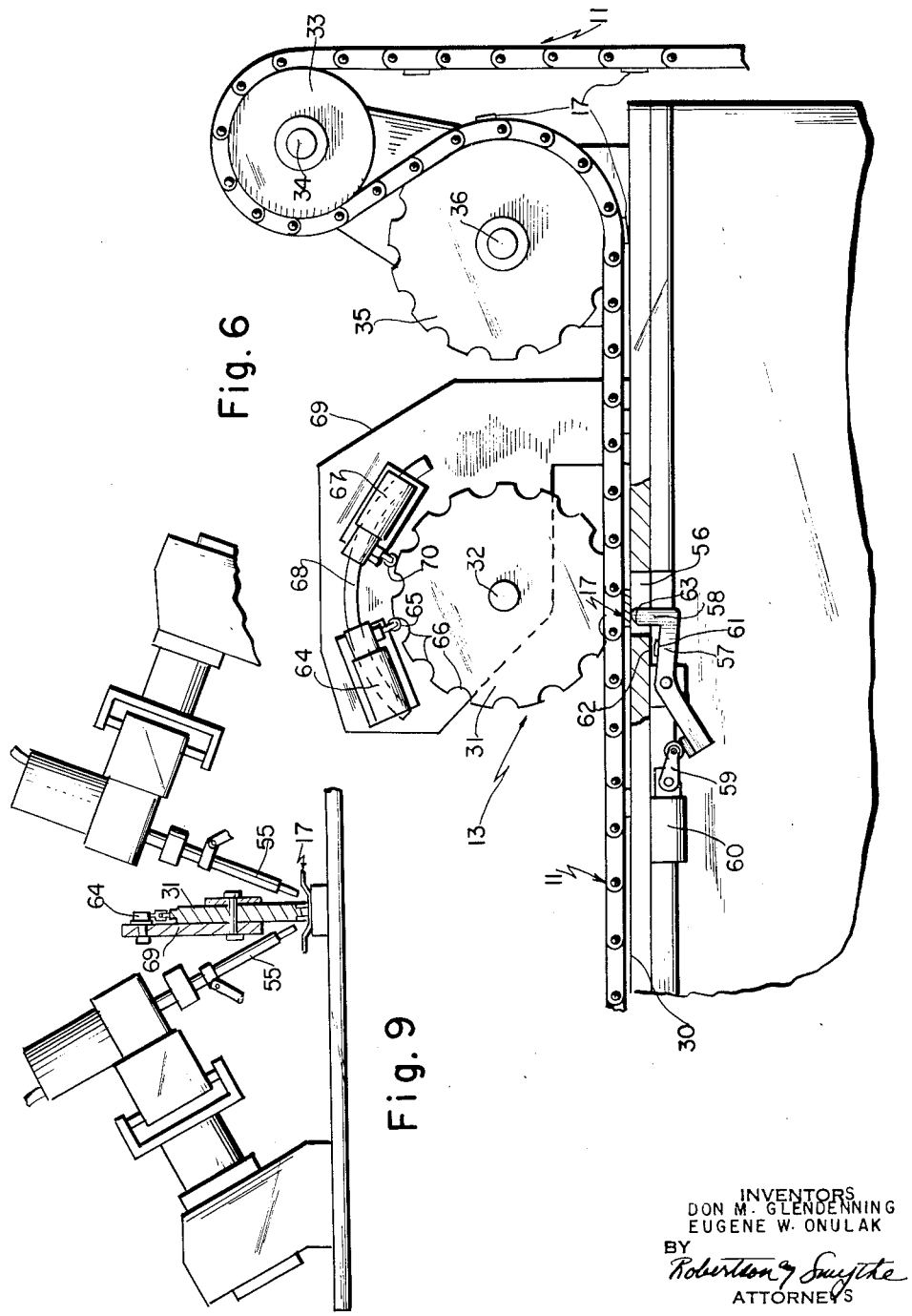

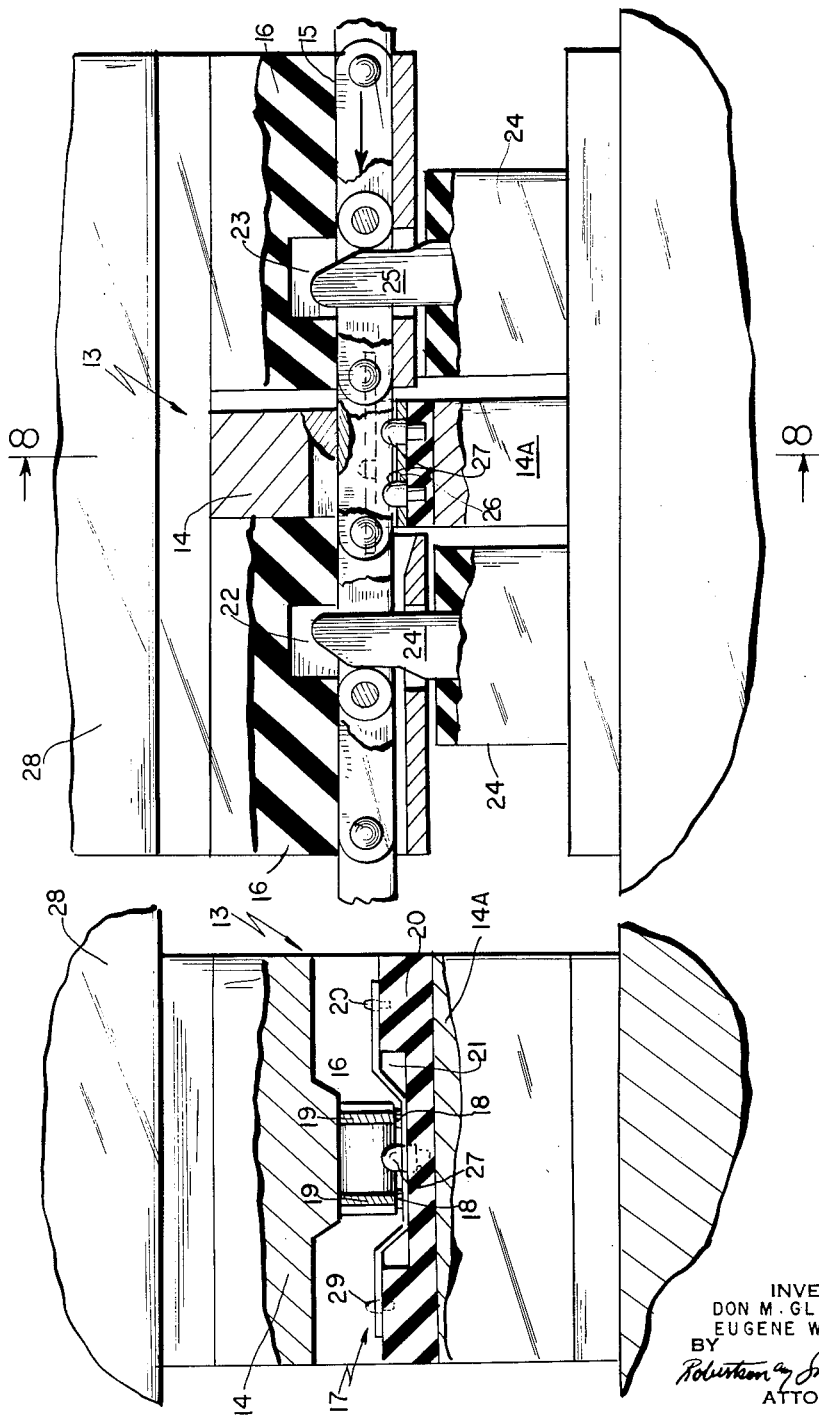

This invention relates to the assembling of attachments and, more particularly, to the assembling of attachment members to links of a chain.

Attachment members, for example, are elements carried by a chain for the purpose of supporting work elements such as scrapers or for performing work on material, for example, corn pickers.

In securing attachment members upon chain links, it has been found desirable to arc weld the attachments to selected links, particularly where it is contemplated that the attachments will carry rather large loads. Where the arc welding operation is performed at a single station, an undesirable condition exists wherein a considerable amount of splatter from the iron or welding material is deposited upon the fixtures. This not only results in waste of welding material but also requires removal of the unwanted deposits.

One of the objects of the invention is to provide an improved arrangement for assembling attachments to links of a chain in a more efficient and economical manner.

Another object of the invention is to provide a means of securing an attachment to a chain link at spaced points in a manner to produce a strong structure for transporting heavy loads.

In one aspect of the invention, an attachment plate is temporarily attached or prepositioned to a chain link at a first station. The link and attachment plate are then transferred to a second station where they are permanently or completely secured to each other.

In another aspect of the invention, the attachment plate and link are temporarily attached to each other by means of resistance projection or spot welding and are permanently secured by means of arc welding.

In a still further aspect of the invention, the attachment plate may be formed with partially sheared projections prior to being attached temporarily to the link.

In another aspect of the invention, the link is periodically advanced to a first station where an attachment is resistance welded thereto, and then the link and attachment are continuously fed through a second station where they are permanently secured to each other.

The foregoing and other objects, features and advantages hereof will become apparent from the following description and drawings which are merely exemplary.

In the drawings:

FIG. 1 is a perspective view of an attachment plate which is to be secured to a chain link;

FIG. 2 is a fragmentary sectional view of the link of FIG. 1, showing partially sheared projections;

FIG. 3 is a plan view of the attachment secured to the link of a chain;

FIG. 4 is a schematic side elevational view of a multi-station machine in accordance with the present invention;

FIG. 5 is a top view schematically showing a drive mechanism for the machine of FIG. 4;

FIG. 6 is a fragmentary enlarged elevation of the indexing mechanism of the second welding station of FIG. 4;

FIG. 7 is an enlarged front fragmentary view partially in section of the preliminary apparatus at the left of FIG. 4;

FIG. 8 is a view taken in the direction of line 8—8 of FIG. 7; and

FIG. 9 is an end view of the station where the attachments are permanently secured to the links, portions thereof being in section.

The present invention is particularly suitable for fastening attachments to a chain of the type shown, for example, in U.S. Patent No. 2,795,536. The arrangement has a first or preliminary attachment station 12 and a second or permanent fastening station 13. After chain 11 (FIG. 3) has been assembled at an assembly station (not shown), it is fed through a projection welding machine or first station 12 (FIG. 4) by a suitable sprocket indexing means (not shown) which will stop the chain at the desired location for insertion of an attachment to a selected link. The chain is periodically advanced through the first station or means 12 such that selected links successively come to rest between upper and lower clamping elements or electrodes 14, 14A (FIGS. 3, 7, 8) in the preliminary attaching or resistance welding apparatus 12. As an example, every fourth link may come to rest at the first station in readiness for a temporary or preliminary attachment of a plate thereto. The chain slides horizontally through longitudinal passages 15 (FIG. 7) in guide members 16, said guide members being carried by reciprocable head 28.

Attachment plates 17 (FIGS. 1, 3) which may have partially sheared projections 18 (FIGS. 1, 2) protruding upwardly therefrom are successively fed to a position under the chain. Preferably, the feed is in a direction perpendicular to the chain travel to a position under the legs 19 of selected links by any suitable feed arrangement. The attachment plate 17 may then be clamped between said selected chain link and the electrodes 14, 14A of the first station. There will be a localized area of contact between the projections 18 and the bottom edges of the legs 19, 19. The lower portion or saddle 20 of the clamping arrangement is preferably recessed at 21 to receive each attachment plate 17 in turn. Each guide member 16, 16 has a suitable opening 22, 23 (FIG. 7) to receive camming or locating pins 24, 25 for engaging the link and holding it in position for the preliminary attachment. Apertures 26 (FIG. 1) formed in the central portion of the attachment plate member receive guide projections 27 (FIG. 7) for positioning of the attachment and link relative to each other. The attachment may have apertures 28A in each wing thereof, depending upon the particular fixture, for attaching a load or device to be conveyed by the completed chain and attachment structure. Locating pins 29 may also be carried by saddle 20 for cooperation with apertures 28A, 28A for further assistance in positioning the attachment plate.

Power is applied to the electrodes in a conventional manner at the localized area of the link and attachment when the reciprocable head 28 reaches its lower position, so that the projections will be temporarily attached or projection welded to the legs 19 of the selected chain link. Spot welding also could be used and the projections struck up or formed in other manners.

Suitable limit switches (not shown) responsive to the extreme positions of the reciprocable head 28, may be provided for controlling the operation of the chain feed indexer or sprocket mechanism 29A.

The chain can be wound onto a reel or the like, although it is preferred that it be moved directly to the second or arc welding station 13.

As the chain, with attachment plates temporarily attached to selected links thereof, leaves the first or projection welding station 12, it may be fed to the arc welding machine or station 13 with the plates 17 sliding along a horizontal surface 30. The feed of the chain through station 13 is by means of a notched wheel 35 (FIGS. 4, 6) on shaft 36 that is rotatably driven at predetermined speeds as described hereafter. Preferably, the chain is continuously moved through the second or permanent attachment station or it may be moved intermittently.

A rotatable roll 33 secured to shaft 34 may be provided forward of and above the sprocket 35. The forward end of the chain is fed around the roll 33 to assist in pulling the chain through the station 13.

Shaft 34 (FIG. 6 and schematically seen in FIGS. 4 and 5) is drivingly connected to shaft 36 by timing belt 37 (FIGS. 4, 5) and ribbed pulley 38, 39. The high speed motor or indexing motor 40 is connected through clutch 41, shaft 42, pulley 43 and indexing belt 44 to drive pulley 45 and shaft 36. The slow speed motor 46 drives shaft 47 and clutch 48 through a gear reduction means 49, such being operative when the attachment moves past the welding station for continuous welding movement. When one of the clutches 41 or 48 is engaged, the other is disengaged. The dimensions of ribbed pulley 38, 39 are such that the peripheral speed of sprocket 35 equals that of roll 33.

Since there are separate modes of chain feed through the stations 12 and 13, it is apparent that a certain amount of slack as indicated at 49A will be present in the chain between the stations adjacent freely rotatable sprocket 50. Should the slack diminish to the extent that the chain tends to become taut as at 51, it will engage actuator 52 of switch 53 to terminate operation of the drive means related to the station 13. Also, if there is too much slack, the chain will hit proximity switch 54 so as to terminate operation, or if desired, speed up feed of the chain.

Welding electrodes 55 (FIG. 9) are provided on either side of wheel 31 of station 13 in a position so that when power is supplied to the electrodes as the selected links and temporarily attached plates are fed past, the attachment plates will be completely welded to the links.

Energizing means for energizing the electrodes may be actuated by travel of the plates 17 over a substantially central opening 56 in the supporting surface 30 adjacent the electrodes. The energizing means may include a pivotally mounted lever 57 which has a forwardly extending, upturned leg portion 58 positioned in the opening 56. The lever 57 is normally biased in a counterclockwise direction as viewed in FIG. 6 by any suitable means. Its rearward portion abuts switch actuator 59 of the normally open switch 60. A stop element 61 is provided on the lever for normal engagement with the undersurface 62 of chain suport 30 such that camming surface 63 on the rearward side of the upturned leg 58 is normally positioned in the path of a portion of the plates 17 that extends outwardly or sidewardly of their attached chain link legs. The limit switch 60 is preferably connected in series with the limit switch 64 which has an actuating follower 65 engageable in the notches 66 of wheel 31. The wheel 31 is rotatably driven by engagement with the openings of the chain as it is fed through the station 13.

As each attachment plate 17 contacts the camming surface 63, it pivots the lever 57 in a clockwise direction to a position as shown in FIG. 6, thereby depressing the biased actuator 59 of switch 60 to close the same until the plate has passed over the upturned leg 58. Closing of switch 60 causes engagement of clutch 48 which will change the travel speed of the chain through station 13 from a fast chain moving speed to a slow welding speed.

At this time, both of the welding circuit switches 64 and 67 are in open position. As the wheel 31 is rotated at slow speed, the switch follower 65 will fall into a slot or notch 66 on the peripheral surface of wheel 31 to thereby close switch 64 and thus activate the welding circuit. The welding electrodes are energized when both the limit switches 64 and 67 are closed simultaneously, to perform a complete welding of each attachment plate 17 to its selected link.

Switches 64 and 67 are adjustably mounted along arcuate slot 68 of holder plate 69. Switch 67 is normally in its closed position until the follower 70 thereof drops into a notch 66 of the rotating wheel 31 and thereby opens the welding circuit. By adjusting the position of switches 64 or 67 with respect to plate 69 and the peripheral surface of wheel 31, a predetermined timed relation may be obtained for the sequential operation of the welding circuit as controlled by switch followers 65 and 70. As each attachment plate is arc welded to its link and travels past leg 58 of the pivoted lever, limit switch 60 will return to its normal open position to cause engagement of clutch 41 and disengagement of clutch 48. Thus, the feed of the chain will be increased to its high speed until the next attachment plate contacts camming surface 63. The various switches and control circuits can be connected in conventional circuits to accomplish the foregoing.

It should be apparent that details of construction can be varied without departing from the spirit of the invention except as defined in the appended claims.

What is claimed is:

1. The method of securing an attachment to a selected link of a continuous chain, comprising the steps of periodically advancing said link to a first station, projection welding said attachment to said link at said first station, transferring said link to and continuously feeding it through an arc welding station, and welding said attachment to said link as the link and attachment are continuously fed past said latter station.

2. The method of securing attachments to selected links of a continuous chain, comprising the steps of periodically advancing one of said links to a first station, projection welding an attachment to said one link at said first station to form a preliminary connection between said one link and said attachment, transferring said one link to and continuously feeding it through a second station while a subsequent link is periodically advancing to said first station, and completely welding said attachment to said one link as the link and attachment are continuously fed past said second station to form a complete connection between said one link and said attachment.

3. The method of securing attachments each having a plurality of spaced projections on a face thereof to an edge of the legs of selected U-shaped links in a continuous chain that is subsequently fed to an arc welding machine, comprising the steps of periodically advancing selected chain links to a station having spaced means for holding the chain and resistance welding apparatus therebetween, and during the interval of a selected link being positioned at said station adjacent said welding apparatus, holding said chain, locating one of said attachments with its projections in abutment with the leg edges of said positioned link to form a localized contact area, applying compressive pressure to said abutting link and attachment, passing heavy electric current through said localized contact area to weld the same thereto, and thereafter feeding the selected chain link with said attachment welded thereto in said localized area to an arc welding machine for completing the welding between the selected link and said attachment.

4. An apparatus for securing an attachment to a link of a continuous chain, comprising means at a first station for projection welding the attachment to spaced localized areas on said link, means for transferring said link to and continuously feeding it through a second station, and means for permanently welding said attachment to said link as the link and attachment are continuously fed past said second station.

5. Apparatus for securing attachments each having a plurality of spaced projections on a face thereof to an edge of the legs of selected U-shaped links in a continuous chain that is subsequently fed to an electric welding machine, comprising means for periodically advancing selected chain links to a first station, said first station having spaced means for holding said chain, said station also having means for locating one of said attachments with its projections in abutment with the leg edges of a selected link to form a localized contact area during the interval in which the latter is positioned at said station, means for applying a compressive pressure to said abutting link and attachment while passing an electric current through said localized contact area to weld the same, an electric welding machine, and means for feeding the selected link and attachment to said welding machine for completing the weld between the selected link and attachment.

References Cited by the Examiner

UNITED STATES PATENTS

| | | | |
|---|---|---|---|
| 463,487 | 11/91 | Coffin | 219—117 |
| 1,290,091 | 1/19 | Cole | 219—127 X |
| 1,700,319 | 1/29 | Kjekstad | 219—127 X |
| 1,810,005 | 6/31 | Burnish | 219—137 |
| 1,812,151 | 6/31 | Jacocks | 219—91 X |
| 1,865,275 | 6/32 | Reyburn | 219—103 |
| 1,917,037 | 7/33 | Jessop et al. | 219—137 |
| 2,336,791 | 12/43 | La Barre | 219—93 X |
| 2,447,012 | 8/48 | Hayes | 219—93 X |
| 2,843,725 | 7/58 | Granberg | 219—105 |

RICHARD M. WOOD, *Primary Examiner.*